United States Patent
Blandford

(10) Patent No.: US 7,559,292 B2
(45) Date of Patent: Jul. 14, 2009

(54) ANIMAL CONTROL ARRANGEMENT METHOD

(76) Inventor: January Blandford, 134 Seawall Rd., Rancho Palos Verdes, CA (US) 90275

(*) Notice: Subject to any disclaimer, the term of this patent is extended or adjusted under 35 U.S.C. 154(b) by 0 days.

(21) Appl. No.: 11/981,327

(22) Filed: Oct. 31, 2007

(65) Prior Publication Data

US 2008/0110415 A1 May 15, 2008

Related U.S. Application Data

(60) Division of application No. 11/514,068, filed on Aug. 31, 2006, now Pat. No. 7,322,316, which is a continuation of application No. 11/389,328, filed on Mar. 27, 2006, now Pat. No. 7,182,044, which is a continuation of application No. 10/347,611, filed on Jan. 21, 2003, now Pat. No. 7,040,256.

(51) Int. Cl.
*A01K 27/00* (2006.01)
(52) U.S. Cl. ...................................... 119/796
(58) Field of Classification Search ................. 119/769, 119/770, 771, 792, 794, 795, 796, 797, 798
See application file for complete search history.

(56) References Cited

U.S. PATENT DOCUMENTS

| | | | |
|---|---|---|---|
| 4,879,972 A | 11/1989 | Crowe et al. |
| 4,892,063 A | 1/1990 | Garrigan |
| 5,632,234 A | 5/1997 | Parker |
| 5,701,848 A | 12/1997 | Tozawa |
| 5,852,988 A | 12/1998 | Gish |
| 5,901,668 A | 5/1999 | Goodger, Sr. |
| 6,237,539 B1 | 5/2001 | Sporn |
| 6,247,428 B1 | 6/2001 | Mireles |
| 6,273,029 B1 | 8/2001 | Gish |
| 6,439,168 B1 | 8/2002 | Maglich et al. |
| 6,530,131 B1 | 3/2003 | Hopkins |
| 6,539,897 B1 | 4/2003 | Dossenback |
| 6,626,132 B1 | 9/2003 | Mann |
| 6,792,893 B1 | 9/2004 | Quintero et al. |
| 7,040,256 B2 | 5/2006 | Wiggins |
| 7,182,044 B1 | 2/2007 | Blandford |
| 2006/0288961 A1 | 12/2006 | Blandford |

*Primary Examiner*—T. Nguyen
(74) *Attorney, Agent, or Firm*—Cislo & Thomas LLP

(57) ABSTRACT

An animal control arrangement having a plurality of leashes which may be attached to the collars of animals to be controlled while walking, exercising, training, or the like and which reduces the likelihood of the leashes becoming tangled.

25 Claims, 5 Drawing Sheets

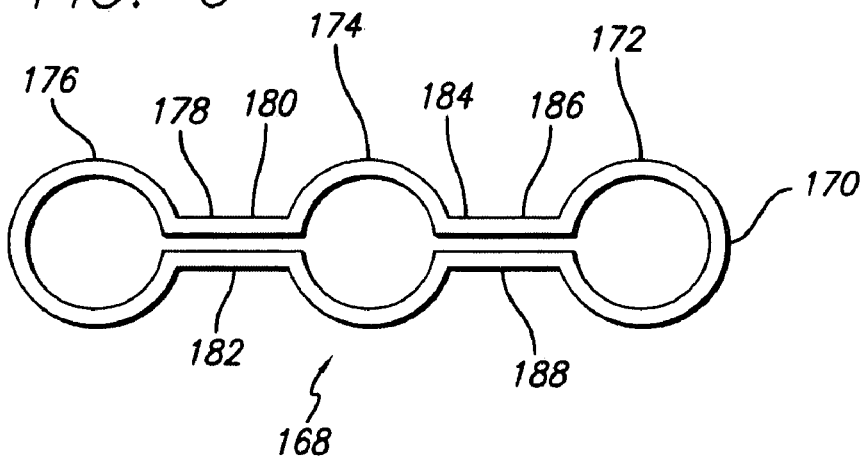
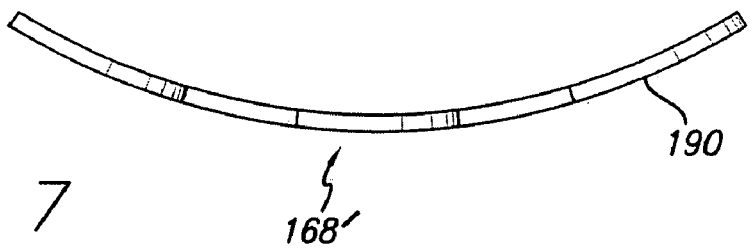
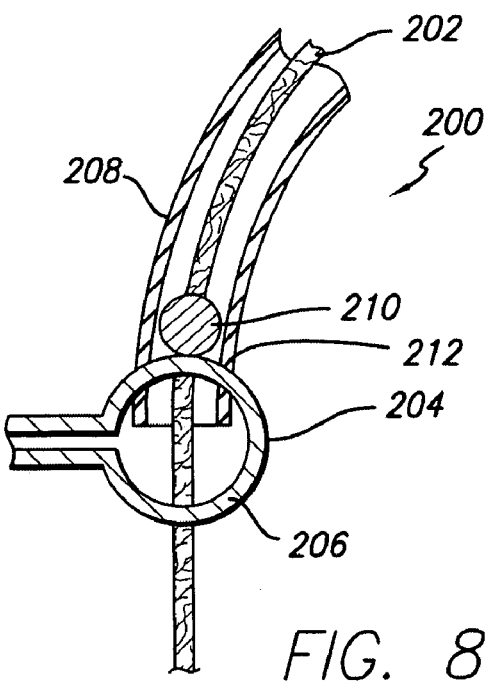

ANIMAL CONTROL ARRANGEMENT METHOD

CROSS-REFERENCE TO RELATED APPLICATION(S)

This document is a divisional application that is related to, and claims priority through, U.S. patent application Ser. No. 11/514,068, entitled "Animal Control Arrangement," filed on Aug. 31, 2006 now U.S. Pat. No. 7,322,316, which, in turn, is a continuation application that is related to, and claims priority through, U.S. patent application Ser. No. 11/389,328, also entitled "Animal Control Arrangement," filed on Mar. 27, 2006, now issued as U.S. Pat. No. 7,182,044 on Feb. 27, 2007, which, in turn, is a continuation application that is related to, and claims priority from, U.S. patent application Ser. No. 10/347,611, also entitled "Animal Control Arrangement," filed on Jan. 21, 2003, now issued as U.S. Pat. No. 7,040,256 on May 9, 2006.

TECHNICAL FIELD

This invention relates to the animal control art and more particularly to an anti-tangling leash arrangement for controlling a plurality of animals, such as dogs, during walking, exercising, training, or other activities, wherein two or more animals must be simultaneously controlled.

BACKGROUND ART

A major problem often arising when one person is required to simultaneously control a plurality of animals, such as dogs during walking, exercising, training, or the like, is that the leashes which are attached to the dogs often become tangled and twisted together as the dogs tend to move in separate and erratic paths. Many cities in the United States have leash laws that require that dogs be restrained on a leash generally specified to be no more than a particular length, such as six feet in length, when in public. As such, the dogs cannot generally be allowed to roam freely, except in specific designated public areas that are generally designated as "dog parks." Unless a person is fortunate enough to live close to such a dog park or live in an area where no leash laws exist, most of the time such person is required to simultaneously walk, train, exercise, or the like a plurality of dogs in public, wherein each of the dogs must be restrained on the required leash.

During such simultaneous control of a plurality of dogs by one person, it is generally desired that each of the leashes be held in one hand, thereby leaving the other hand free for other activities.

Various arrangements have been proposed for the control of a plurality of dogs by one person, during walking, exercise, training, or the like of the dogs, while maintaining each dog on a separate leash with the desired objective of preventing the entanglement of the leashes. Such prior art arrangements have not always proven to be satisfactory in many applications. Therefore, a need has long been felt for a control arrangement that allows one person to control simultaneously a plurality of animals, such as dogs, during exercise, walking, training or the like thereof while such animals are on individual leashes and which minimizes the entanglement of the leashes.

DISCLOSURE OF THE INVENTION

Accordingly, an object of the present invention is to provide an improved animal control arrangement.

Another object of the present invention is to provide an animal control arrangement useful in the application of one person simultaneously controlling a plurality of animals.

Yet another object of the present invention is to provide a multiple leash arrangement for allowing one person to control simultaneously a plurality of animals while each of the animals is restrained on an individual leash.

Yet another object of the present invention is to provide a multiple leash arrangement for allowing one person to control simultaneously a plurality of animals while each of the animals is restrained on an individual leash and which reduces the occasions of the tangling of the leashes during the walking, exercising, training, or the like of the animals.

The above and other objects of the present invention are achieved, according to a preferred embodiment thereof, by providing a body member having a plurality, such as two (though more may be desired in many applications), of substantially rigid mounting portions in a spaced-apart array. Each of the plurality of mounting portions has a preselected geometrical configuration such as bone end shaped round, quadrilateral, polygonal, or other desired shapes. Each of the mounting portions has peripheral walls defining a central cavity extending therethrough and the peripheral walls have a predetermined geometrical configuration in cross section. The body member also has a rigid joining portion for connecting the mounting portions in the spaced-apart array.

In this embodiment of the present invention, a plurality of flexible, resilient, coil spring-like members are also provided having a central cavity therethrough defined by the coils of the spring-like member and one of the plurality of flexible, resilient, coil spring-like members is movably connected to each of the rigid mounting portions for sliding movement on peripheral walls thereof. A plurality of leash members is provided, each of the plurality of leash members having a handle end and an attachment end. One member of the plurality of leash members is threaded through the tube like members. The attachment end of each leash member is spaced away from the body member in a first direction; and the handle end of each leash member extends in a second direction away from the body member, whereby each of the attachment ends of the plurality of leash members may be attached to an animal, such as a dog, to be controlled, and whereby the handle end of each leash member may be held by the person controlling the animal.

A restraining member is coupled to each member of the plurality of leash members intermediate the attachment end thereof and said handle end thereof for preventing the leash members from moving out of said flexible, resilient, coil spring-like member in a direction toward the handle end thereof and allowing said leash member to slide through the flexible, resilient, coil spring-like member in a direction toward said attachment end thereof. For the condition of an animal, such as a dog, attached to the attachment end of the leashes and the person controlling the dog has grasped the handle end of the leashes, the restraining member is in abutment with the body member and preventing the leashes from movement toward the handle end thereof and defining a predetermined separation of the animals from the body member.

This embodiment of the animal control arrangement has been found to reduce the tendency of the leashes to become entangled or twisted together as the animals tend to walk and wander in various directions during the walk, exercise, training, or the like by the person controlling the animals and facilitates what the person desires the animals to do.

The mounting portions of the body member may be made in any desired geometrical configuration as long as there are peripheral walls defining a cavity therethrough. Thus, the mounting members may be in the form of a bone end, a ring, a quadrilateral such as a square, diamond, trapezoid, parallelogram, etc., or may be in the form of any desired other polygon. The mounting portions of the body member may also be in the form of a ring, an oval, or other curvilinear configuration.

The cross-sectional configuration of the peripheral walls of the mounting members may be, for example, tubular, solid rod-like, rectangular or square ribbon-like or any other desired geometrical shape. Similarly, the joining portion may have a cross-sectional configuration of a single tube like, rod-like, ribbon-like or any other desired configuration. The joining portion may be split into two or more spaced-apart sections as may be desired for certain conditions.

In other embodiments of the present invention the flexible, resilient, coil spring-like members may be replaced by tubular members.

The exact physical laws which explain why these embodiments of the present invention act to reduce the tendency of the leashes to become tangled or entwined is not known.

The leashes may be conventional fixed-length leashes or they may be the extendible type of leash in which a controller is provided with a spring-loaded reel upon which the leash is wound and a handle portion for holding the controller. Operable buttons selectively allow the leash to extend from the controller against the spring tension and be retracted into the controller by the spring action as desired.

BRIEF DESCRIPTION OF THE DRAWING

The above and other embodiments of the present invention may be more fully understood from the following detailed description, taken together with the accompanying drawing in which similar reference characters refer to similar elements throughout and as follows.

FIG. 6 illustrates another body member useful in the practice of the present invention.

FIG. 7 illustrates another body member useful in the practice of the present invention.

FIG. 8 illustrates another embodiment of the present invention.

MODE(S) FOR CARRYING-OUT THE INVENTION

Figure 1:
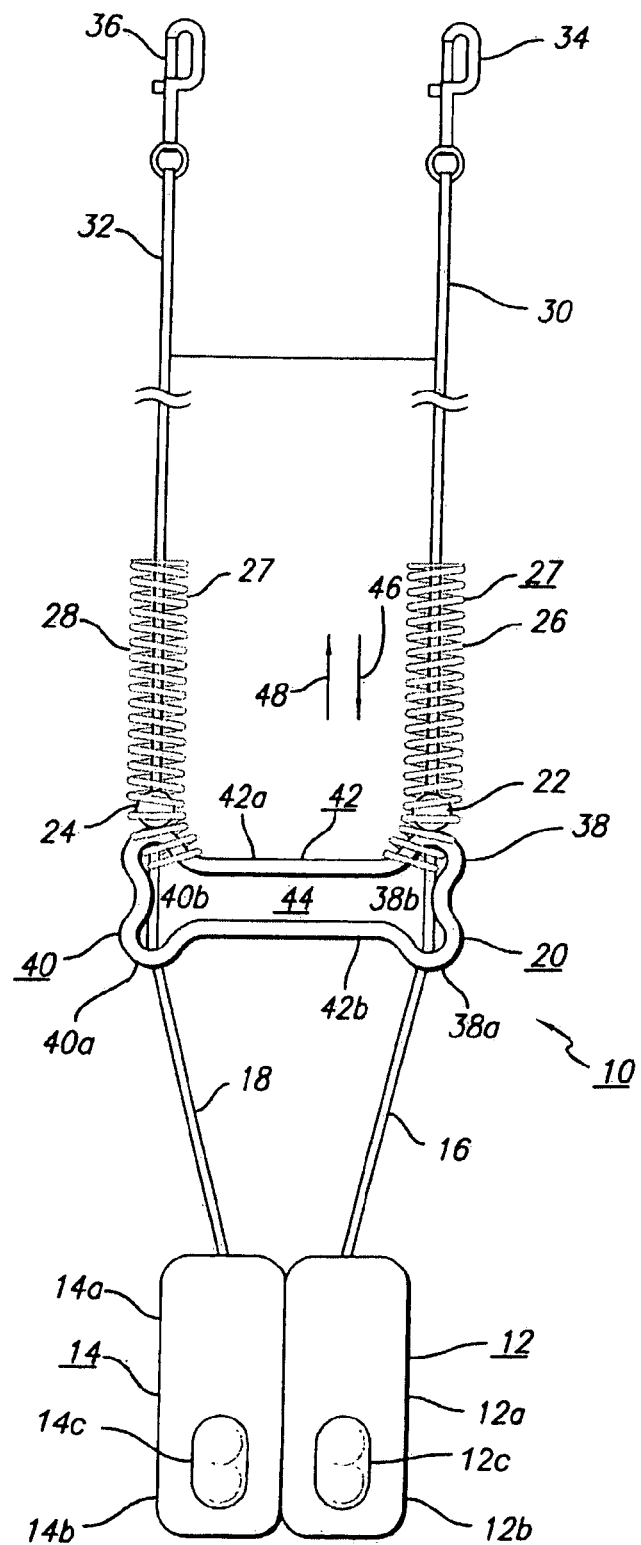
FIG. 1 illustrates a preferred embodiment of the present invention.

Referring to FIG. 1, a preferred embodiment of the present invention is generally designated as embodiment 10. The embodiment 10 is provided with a pair of extendible leash controllers 12 and 14 that may be fixedly coupled together. The controllers 12 and 14 have a spring-loaded reel portion 12a and 14a, respectively, and a handle portion 12b and 14b respectively. A leash 16 extends from the spring loaded reel portion 12 and a leash 18 extends from the reel portion 14a. The leashes 16 and 18 extend against the tension of the spring in the controllers and are retracted into the respective reel portion by the action of the spring loaded reel. The controllers 12 and 14 may be one of the many of the types of extendable leash arrangements such as those sold under the trademark TOP PAW® by Pacific Coast Distributing, Inc., P.O. Box 84613, Phoenix, Ariz. 85071, or those sold under the trademark SPOTLIGHT® by Ruff & Tumble Company, 21755 Ventura Blvd., Woodland Hills, Calif. 91364, or those sold under the trademark FLEXI® by Flexi USA, 147 Circle Freeway, Cincinnati, Ohio 45246 and are useful in the practice of this embodiment of the present invention. The handle portions 12b and 14b may, for purposes of the description of the present invention, be considered the handles of the leashes 16 and 18, respectively. Buttons 12c and 14c are utilized to control the extension and retraction of the leashes 16 and 18, respectively, and may be individually operated or jointly operated by a rocker button (not shown). While two controllers 12 and 14 are shown on FIG. 1, more than two such controllers may be conveniently joined together for appropriate operation according to the principles of the present invention.

The leashes 16 and 18 extend past a body member 20, through retainers 22 and 24 which are fixedly coupled to the leashes 16 and 18 respectively, through a separator generally designated as separator 27 which, in the embodiment 10, are flexible, resilient, coil spring-like members 26 and 28, respectively, and terminate at the attachment ends 30 and 32, respectively, which are connected to swivel snap fasteners 34 and 36. The swivel snap fasteners 34, 36 may be attached to the collars of the animals to be controlled.

The body member 20 has a pair of substantially rigid mounting portions 38 and 40 in a fixed spaced-apart array; and the substantially rigid mounting portions 38 and 40 are maintained in this fixed spaced-apart array by a rigid joining portion 42. In the embodiment 10, the body member 20 is in the form of a "bone" and the mounting portions 38 and 40 are in the form of "bone ends." As described below in connection with FIG. 4, the body member 20 is useful in various embodiments of the present invention and may take a variety of configurations.

Each of the mounting portions 38 and 40 has a pre-selected shape with a pre-selected geometrical configuration. The mounting portions 38 and 40 have peripheral walls 38a and 40a defining a cavity 38b and 40b. The mounting portions 38 and 40 may have any desired cross-sectional configuration as described below in connection with FIG. 5.

The rigid joining member 42 is, in the embodiment 10, a pair of spaced-apart joining sections 42a and 42b which may also have any desired cross-sectional configuration as described below in connection with FIGS. 5A through 5D.

The flexible, resilient, coil spring-like members 26 and 28 are mounted on the mounting portions 38 and 40, respectively, for sliding motion on the peripheral walls 38a and 40a, respectively, but are preferably retained by their configuration from entering the space 44 between the joining sections 42a and 42b.

The retaining members 22 and 24, as noted above, are fixedly coupled to the leashes 16 and 18, respectively, and abut against the peripheral walls 38a and 40a, respectively, thereby restraining the leashes 16 and 18 from further retraction by the reel towards the handles 12b and 14b, respectively as indicated by the arrow 46. The retainers 22 and 24 are sized so as to be freely movable through the flexible, resilient, coil spring-like members 26 and 28, respectively, in the direction of the attachment ends 30 and 32 as indicated by the arrow 48. Such movement in the direction of the arrow 48 is accomplished by selectively releasing the buttons 12c and/or 14c allowing the animals (not shown) connected to the snap swivels 34 and 36 to pull the leashes 16 and 18 as far out as the person controlling the animals desires.

Figure 2:
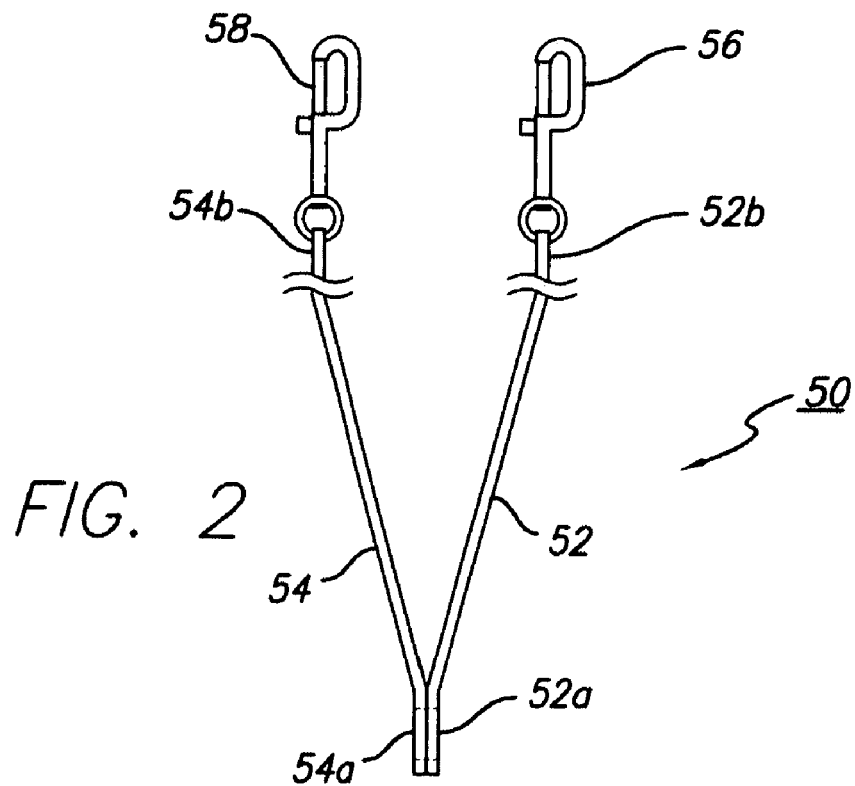
FIG. 2 illustrates a multiple leash useful in the practice of the present invention.

In other embodiments of the present invention, utilizing fixed-length leashes may be desired. FIG. 2 illustrates the use of fixed length leashes in an embodiment 50 of the present invention. The pair of leashes 52 and 54 may be conventional leashes having handle ends 52a and 54a and attachment ends 52b and 54b to which are connected snap swivels 56 and 58. The body member, retainer, and flexible, resilient, coil spring-like members have been omitted from FIG. 2 for clarity. If desired, the handle ends 52a and 54a may be coupled together, e.g., by sewing, gluing, or the like.

Figure 3:
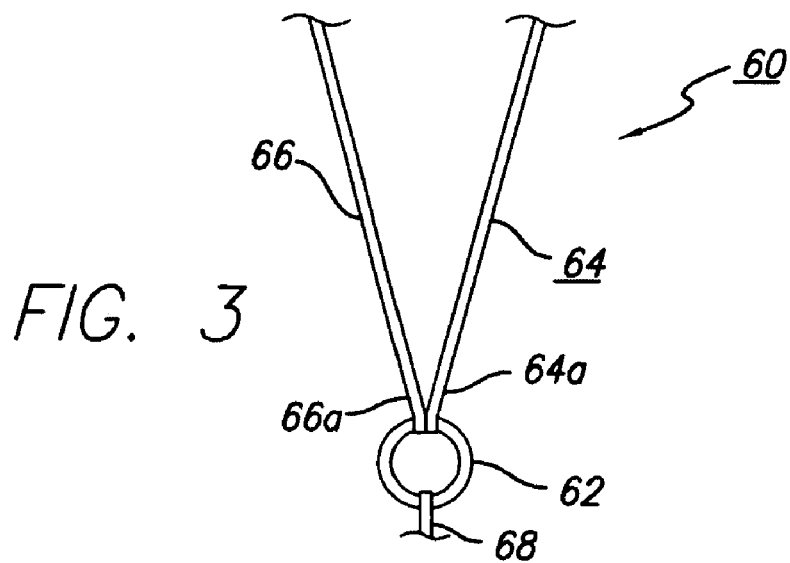
FIG. 3 illustrates another multiple leash useful in the practice of the present invention.

FIG. 3 illustrates another embodiment of the present invention generally designated embodiment 60 which is similar to the embodiment 50, except that a ring member 62 is utilized to provide connection of the handle end 64a and 66a of leashes 64 and 66, respectively. A separate handle 68 is also connected to the ring member 62 and, thus, may provide a more comfortable handle for grasping by the person controlling the animals. The body member, retainer, and flexible, resilient, coil spring-like members have been omitted from FIG. 3 for clarity.

Figure 4A:
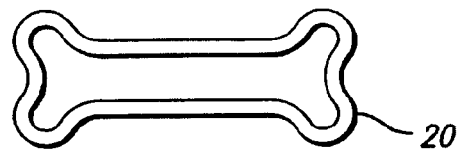
FIGS. 4A through 4I illustrate various geometrical configurations of the body member useful in the practice of the present invention.

FIGS. 4A through 4I illustrate various configurations of the body members which may be advantageously utilized in the practice of the present invention. The shapes and configurations as shown in FIGS. 4A through 4I are only examples. Other configurations may equally well be utilized; and the present invention contemplates any configuration of body member having the basic characteristics as described herein. FIG. 4A shows the "bone shaped" body member 20 as described above in connection with embodiment 10. Any of the mounting portions shown in FIGS. 4A through 4B may be utilized with any of the joining portions shown as may be desired for different applications.

Figure 4B:
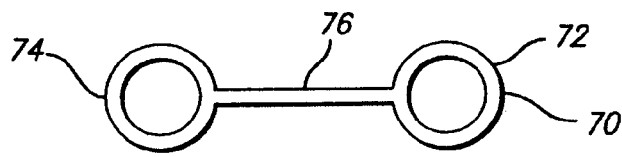

FIG. 4B shows a body member 70 having toroidal-shaped mounting portions 72 and 74 with a single joining portion 76.

Figure 4C:
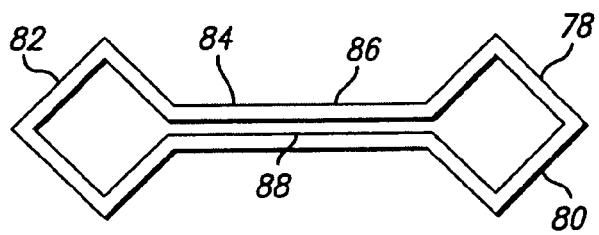

FIG. 4C shows a body member 78 having quadrilateral diamond-shaped mounting portions 80 and 82 with a joining portion 84 having two spaced-apart sections 86 and 88.

Figure 4D:
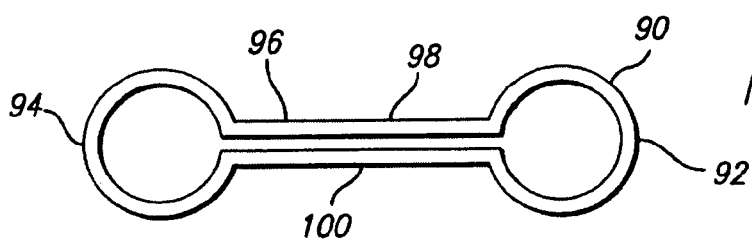

FIG. 4D shows a body member 90 having curvilinear round mounting portions 92 and 94 with a joining portion 96 having two spaced-apart sections 98 and 100. The long axis of the round mounting portions 92 and 94 are perpendicular to the joining member 96.

Figure 4E:
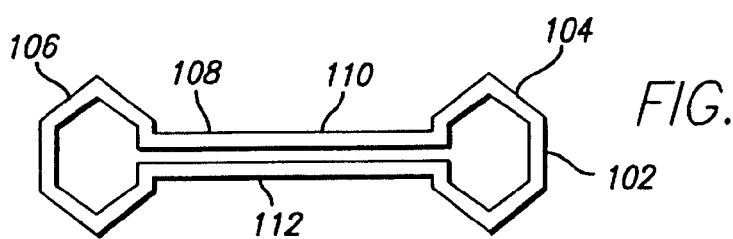

FIG. 4E shows a body member 102 having polygonal hexagonal-shaped mounting portions 104 and 106 with a joining portion 108 having two spaced-apart sections 110 and 112.

Figure 4F:
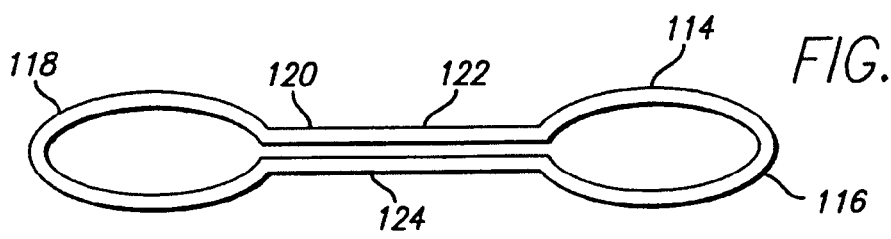

FIG. 4F shows a body member 114 having curvilinear oval-shaped mounting portions 116 and 118 with a joining portion 120 having two spaced-apart sections 122 and 124. The long axis of the ovals mounting portions 116 and 118 are substantially parallel to the joining member 120.

Figure 4G:
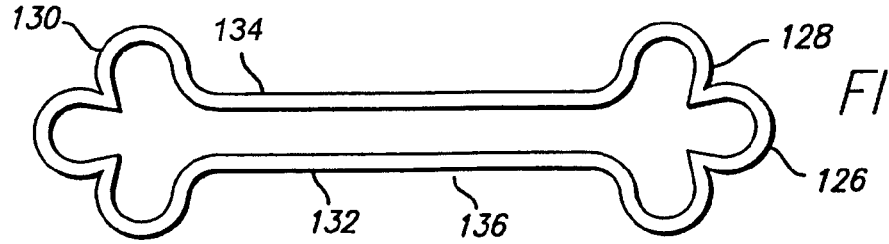

FIG. 4G shows a body member 126 having curvilinear "clover leaf"-shaped mounting portions 128 and 130 with a joining portion 132 having two spaced-apart sections 136 and 134.

Figure 4H:
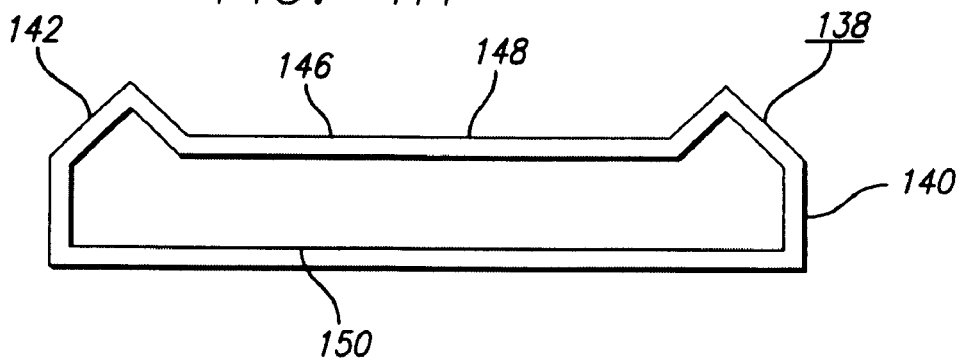

FIG. 4H shows a body member 138 having irregular polygonal-shaped mounting portions 140 and 142 with a joining portion 146 having two spaced-apart sections 148 and 150.

Figure 4I:
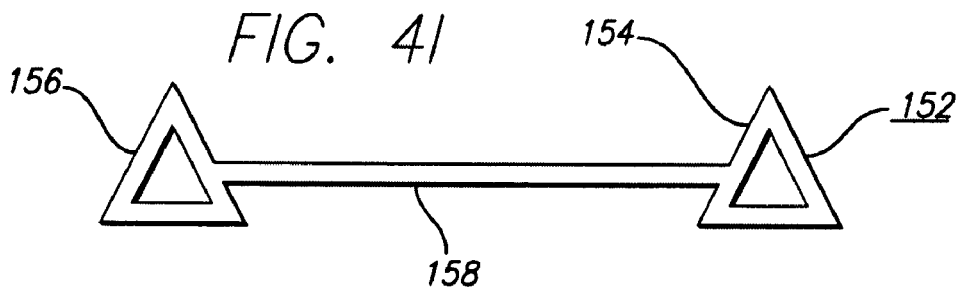

FIG. 4I shows a body member 152 having polygonal triangular-shaped mounting portions 154 and 156 with a single joining portion 158.

Any of the above described body members may be utilized in any of the embodiments of the present invention such as embodiments 10, 50, and 60 described above and embodiment 200 described below in connection with FIG. 8.

Figure 5A:
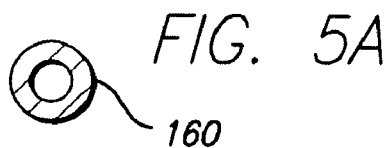
FIGS. 5A through 5D illustrate various cross-sectional configurations of the peripheral walls of the mounting portion and the joining portion of the body member useful in various embodiments of the present invention.
Figure 5B:
Figure 5C:
Figure 5D:

FIGS. 5A through 5D illustrate various cross-sectional configurations that may be utilized in the fabrication of any or all portions of the body member utilized in the practice of the present invention. The mounting portions of the body member may have the same cross-sectional configurations as the joining portion or they may be different. FIG. 5A shows a tube like cross-sectional configuration as indicated at 160. FIG. 5B shows a solid rod-like cross-sectional configuration as indicated at 162. FIG. 5C shows a rectangular ribbon-like cross-sectional configuration as indicated at 164. FIG. 5D shows a square ribbon-like cross-sectional configuration as indicated at 166. Other cross-sectional configurations may be utilized as desired.

The present invention is not limited to arrangements for controlling two animals. That is, the structure taught herein may be adopted to control any number of animals. As noted above, more than two controllers may be fixed together so as to allow controlling of three dogs on leashes. Similarly, the multiple leash arrangements shown on FIGS. 2 and 3 may be modified by adding additional fixed-length leashes as may be desired. The body member for such more than two leash arrangement applications may be modified so as to have three or more mounting portions, the number of mounting portions corresponding to the number of leashes. FIG. 6 illustrates an embodiment generally designated as embodiment 168 of a body member 170 having three mounting portions 172, 174 and 176. A joining portion 178 with two sections 180 and 182 join mounting portions 176 and 174 and joining portion 184 with sections 186 and 188 join mounting portions 174 and 172. The body member 170 may be provided with separator members at each mounting portion and retaining members attached to the leashes as inserted through the separator members, as described above, to allow control of three animals. The body member may be expanded to include as many mounting portions more than three as desired for controlling any desired number of animals.

The body members utilized in the present invention may have the mounting portions lie in the same plane as the joining portion or the body member may be in an arcuate configuration. FIG. 7 illustrates an embodiment 168' of a three-mounting-portion body member similar to the body member 170 described above and wherein the entire body member is in an arcuate configuration. Any of the body members described above may also be fabricated and used in an arcuate configuration or any other non-planar arrangement.

FIG. 8 illustrates a partial cross-sectional view of another embodiment of the present invention generally designated 200. In the embodiment 200, which may be similar to the embodiment 10 described above, a leash 202 is provided that extends past a mounting portion 206 of a body member 204 and may be provided with a retainer 210 fixed thereon. The separator member 208 is in the form of a rigid-walled, curved, tubular member and the separator member 208 is slidingly mounted on the mounting portion 206 which extend through an aperture 212. The separator member may also be a flexible-walled tube-like member as may be desired for particular applications. The operation of the embodiment 200 is similar to the operation of the embodiment 10 described above. Other configurations of a separator member may be utilized as desired to provide the desired functions thereof.

From the above specification, apparent in the present invention is that an improved animal control arrangement has been provided which reduces the occasions on which the leashes become entangled, of which the animals to be controlled are attached. The appended claims are intended to cover all variations and adaptations falling within the scope and spirit of the present invention.

The invention claimed is:

1. A method of fabricating a leashing system for managing a plurality of animals, the method comprising the steps of:
   providing means for leashing the plurality of animals, the leashing means providing step comprising providing a plurality of leashes; and
   providing means for managing the plurality of leashes, the managing means being in mechanical cooperation with the leashing means,
   wherein the leashing means providing step comprises providing a plurality of extendible leash controllers,
   wherein the managing means providing step comprises:
   providing a body member; and
   providing a plurality of separators being mechanically coupled to the body member and facilitating managing, by guiding, the corresponding plurality of leashes, each separator of the plurality of separators being spaced-apart from another separator of the plurality of separators,
   whereby instances of tangling of the plurality of leashes are reduced by the managing means, and
   whereby the plurality of animals are managed.

2. A method, as recited in claim 1, wherein the plurality of extendible leash controllers providing step comprises integrally forming the plurality of extendible leash controllers.

3. A method, as recited in claim 1,
   wherein the plurality of extendible leash controllers providing step comprises separately forming each controller of the plurality of extendible leash controllers, and
   wherein the plurality of extendible leash controllers providing step comprises fastening each controller of the plurality of extendible leash controllers to another controller of the plurality of extendible leash controllers.

4. A method, as recited in claim 1, wherein the plurality of extendible leash controllers providing step comprises:
   providing a corresponding plurality of spring-loaded reel portions; and
   providing at least one handle portion.

5. A method, as recited in claim 4, wherein the plurality of extendible leash controllers providing step comprises providing a corresponding plurality of buttons for independently initiating extension and retraction of the respective plurality of leashes, whereby each leash of the plurality of leashes is selectably extendible and retractable.

6. A method, as recited in claim 1,
   wherein the body member providing step comprises providing a plurality of orifices, and
   wherein the plurality of leashes providing step comprises threading the plurality of leashes through the plurality of body member orifices.

7. A method, as recited in claim 1, wherein the plurality of leashes providing step comprises threading the plurality of leashes through the respective plurality of separators.

8. A method, as recited in claim 1,
   wherein the plurality of leashes providing step comprises providing each leash of the plurality of leashes with a proximal end and a distal end, and
   wherein the plurality of leashes providing step comprises providing a fastener for each leash being mechanically coupled to the distal end for fastening the leash to an animal retention structure selected from a group consisting essentially of an animal collar and an animal harness.

9. A method, as recited in claim 8, wherein the fastener providing step comprises providing a swivel snap.

10. A method, as recited in claim 1, wherein the plurality of separators providing step comprises providing each separator of the plurality of separators with at least one element selected from a group consisting essentially of a hollow structure, a coil, and a tube.

11. A method, as recited in claim 1, wherein the body member providing step comprises providing at least one geometrical configuration selected from a group consisting essentially of a bone-shape, a dog-bone shape, a ring, a quadrilateral shape, a square, a diamond, a trapezoid, a parallelogram, an oval shape, a curvilinear shape, and a polygon.

12. A method of fabricating a leashing system for managing a plurality of animals, the method comprising the steps of:
   providing a leashing structure for leashing the plurality of animals, the leashing structure providing step comprising providing a plurality of leashes; and
   providing a managing structure for managing the plurality of leashes, the managing structure being in mechanical cooperation with the leashing structure,
   whereby instances of tangling of the plurality of leashes are reduced by the managing structure,
   whereby the plurality of animals are managed,
   wherein the leashing structure providing step comprises providing a plurality of extendible leash controllers,
   wherein the plurality of extendible leash controllers providing step comprises configuring an element selected from a group consisting essentially of:
   the plurality of controllers being integrally formed; and
   each controller of the plurality of extendible leash controllers being separately formed, wherein each controller of the plurality of extendible leash controllers is fastened to another controller of the plurality of extendible leash controllers,
   wherein the plurality of extendible leash controllers providing step comprises:
   providing a corresponding plurality of leash retractors with a corresponding plurality of spring-loaded reel portions; and
   providing at least one leash handle portion,
   wherein the plurality of extendible leash controllers providing step comprises providing a corresponding plurality of buttons for independently initiating extension and retraction of the respective plurality of leashes, whereby the plurality of buttons is operated by a rocker button in a manner selected from a group consisting essentially of an individual operation and a joint operation, and whereby each leash of the plurality of leashes is selectably extendible and retractable,
   wherein the managing structure providing step comprises:
   providing a body member; and
   providing a plurality of leash separators being mechanically coupled to the body member and facilitating managing, by guiding, the corresponding plurality of leashes, each leash separator of the plurality of leash separators being spaced-apart from another leash separator of the plurality of leash separators,
   wherein the body member providing step comprises providing a plurality of orifices,
   wherein the plurality of leashes providing step comprises threading the plurality of leashes through the body member orifices,
   wherein the plurality of leashes providing step comprises threading the plurality of leashes through the respective plurality of leash separators,
   wherein the plurality of leashes providing step comprises providing each leash of the plurality of leashes with a proximal end and a distal end, wherein the plurality of leashes providing step comprises providing each leash with a fastener being mechanically coupled to the distal end for fastening the leash to an animal retention structure selected from a group consisting essentially of an animal collar and an animal harness, wherein the plurality of leashes providing step comprises providing each leash separator of the plurality of leash separators with at least one element selected from a group consisting essentially of a hollow structure, a coil, and a tube, and wherein the body member providing step comprises providing at least one geometrical configuration selected from a group consisting essentially of a plurality of orifices, a bone-shape, a dog-bone shape, a ring, a quadrilateral shape, a square, a diamond, a trapezoid, a parallelogram, an oval shape, a curvilinear shape, and a polygon.

13. A method of managing a plurality of animals, comprising the steps of:

providing a leashing structure for leashing the plurality of animals, the leashing structure providing step comprising providing a plurality of leashes; and providing a managing structure for managing the plurality of leashes, the managing structure being in mechanical cooperation with the leashing structure, whereby instances of tangling of the plurality of leashes are reduced by the managing structure, and whereby the plurality of animals are managed, wherein the leashing structure means providing step comprises providing a plurality of extendible leash controllers, wherein the plurality of extendible leash controllers providing step comprises configuring the plurality of controllers as an element selected from a group consisting essentially of:

the plurality of controllers being integrally formed and each controller of the plurality of extendible leash controllers being separately formed, wherein each controller of the plurality of extendible leash controllers is fastened to another controller of the plurality of extendible leash controllers, wherein the plurality of extendible leash controllers providing step comprises:

providing a corresponding plurality of leash retractors having a corresponding plurality of spring-loaded reel portions; and providing at least one leash handle portion, wherein the plurality of extendible leash controllers providing step comprises providing a corresponding plurality of buttons for independently initiating extension and retraction of the respective plurality of leashes, whereby the plurality of buttons is operated by a rocker button in a manner selected from a group consisting essentially of an individual operation and a joint operation, and whereby each leash of the plurality of leashes is selectably extendible and retractable, wherein managing structure providing step comprises:

providing a body member; and providing a plurality of leash separators being mechanically coupled to the body member and facilitating managing, by guiding, the corresponding plurality of leashes, each leash separator of the plurality of leash separators being spaced-apart from another leash separator of the plurality of leash separators, wherein the plurality of leashes providing step comprises threading through the body member, wherein the plurality of leashes providing step comprises threading through the respective plurality of leash separators, wherein the plurality of leashes providing step comprises providing each leash of the plurality of leashes with a proximal end and a distal end, and wherein the plurality of leashes providing step comprises providing each leash with a fastener being mechanically coupled to the distal end for fastening the leash to an animal retention structure selected from a group consisting essentially of an animal collar and an animal harness, wherein the plurality of leash separators providing step comprises providing each leash separator of the plurality of leash separators with at least one element selected from a group consisting essentially of a hollow structure, a coil, and a tube, and wherein the body member providing step comprises providing at least one geometrical configuration selected from a group consisting essentially of a plurality of orifices, a bone-shape, a dog-bone shape, a ring, a quadrilateral shape, a square, a diamond, a trapezoid, a parallelogram, an oval shape, a curvilinear shape, and a polygon.

14. A method of fabricating a leashing system for walking a plurality of pets, the method comprising the steps of:

providing a plurality of extendible leashes, each extendible leash of the plurality of extendible leashes being attachable to a pet at a distal end;

providing a leash handle having at least one leash retractor therein for retracting at least one extendible leash of the plurality of extendible leashes and being attached to a proximal end of each extendible leash of the plurality of extendible leashes; and providing a managing means, the managing means providing step comprising providing a body member and providing a leash separator, the leash separator being mechanically coupled to the body member and being movable along a leash portion of at least one extendible leash of the plurality of extendible leashes by guiding, the corresponding plurality of leashes so as to reduce instances of entanglement between any two extendible leashes of the plurality of extendible leashes when the plurality of extendible leashes are attached to the plurality of pets, wherein the leash handle providing step comprises providing a plurality of extendible leash controllers, the plurality of extendible leash controllers providing at least one pet of the plurality of pets with a greater length of extendible leash from the leash handle in relation to any other pet of the plurality of pets while reducing instances of entanglement between any two extendible leashes of the plurality of extendible leashes while walking the plurality of pets.

15. A method, as recited in claim 14, wherein the plurality of extendible leash controllers providing step comprises integrally forming the plurality of extendible leash controllers.

16. A method, as recited in claim 14, wherein the plurality of extendible leash controllers providing step comprises separately forming each controller of the plurality of extendible leash controllers, and wherein the plurality of extendible leash controllers providing step comprises fastening each controller of the plurality of extendible leash controllers to another controller of the plurality of extendible leash controllers.

17. A method, as recited in claim 14, wherein the plurality of extendible leash controllers providing step comprises providing a corresponding plurality of spring-loaded reel portions.

18. A method, as recited in claim 17, wherein the plurality of extendible leash controllers providing step comprises providing a corresponding plurality of buttons for independently initiating extension and retraction of the respective plurality of leashes, whereby each leash of the plurality of leashes is selectably extendible and retractable.

19. A method, as recited in claim 14, wherein the leash separator providing step comprises:

providing a body member; and providing a plurality of separator members being mechanically coupled to the body member and facilitating managing, by guiding, the corresponding plurality of extendible leashes, each separator member of the plurality of separator members being spaced-apart from another separator member of the plurality of separator members.

20. A method, as recited in claim 19, wherein the body member providing step comprises providing a plurality of orifices, and wherein the plurality of extendible leashes providing step comprises threading the plurality of extendible leash controllers through the plurality of body member orifices.

21. A method, as recited in claim 19, wherein the plurality of extendible leashes providing step comprises threading the plurality of extendible leashes through the respective plurality of separator members.

22. A method, as recited in claim 19, wherein the plurality of extendible leashes providing step comprises providing each extendible leash of the plurality of extendible leashes with a proximal end and a distal end, and wherein the plurality of extendible leashes providing step comprises providing a fastener, for each extendible leash, being mechanically coupled to the distal end for fastening the extendible leash to a pet retention structure selected from a group consisting essentially of a pet collar and a pet harness.

23. A method, as recited in claim 22, wherein the fastener providing step comprises providing a swivel snap.

24. A method, as recited in claim 19, wherein the plurality of separator members providing step comprises providing each separator member of the plurality of separator members with at least one element selected from a group consisting essentially of a hollow structure, a coil, and a tube.

25. A method, as recited in claim 19, wherein the body member providing step comprises providing at least one geometrical configuration selected from a group consisting essentially of a bone-shape, a dog-bone shape, a ring, a quadrilateral shape, a square, a diamond, a trapezoid, a parallelogram, an oval shape, a curvilinear shape, and a polygon.

* * * * *